Feb. 20, 1962  A. G. SAURWEIN  3,022,365
DEFERRED ACTION ELECTRIC BATTERY
Filed Dec. 26, 1946  2 Sheets-Sheet 2
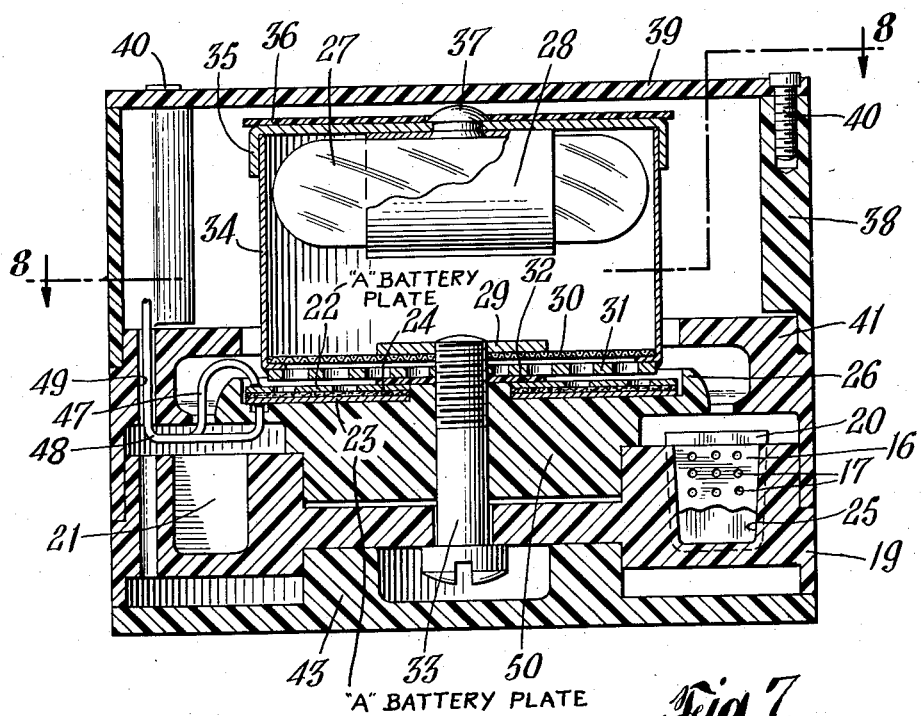
Fig. 7.
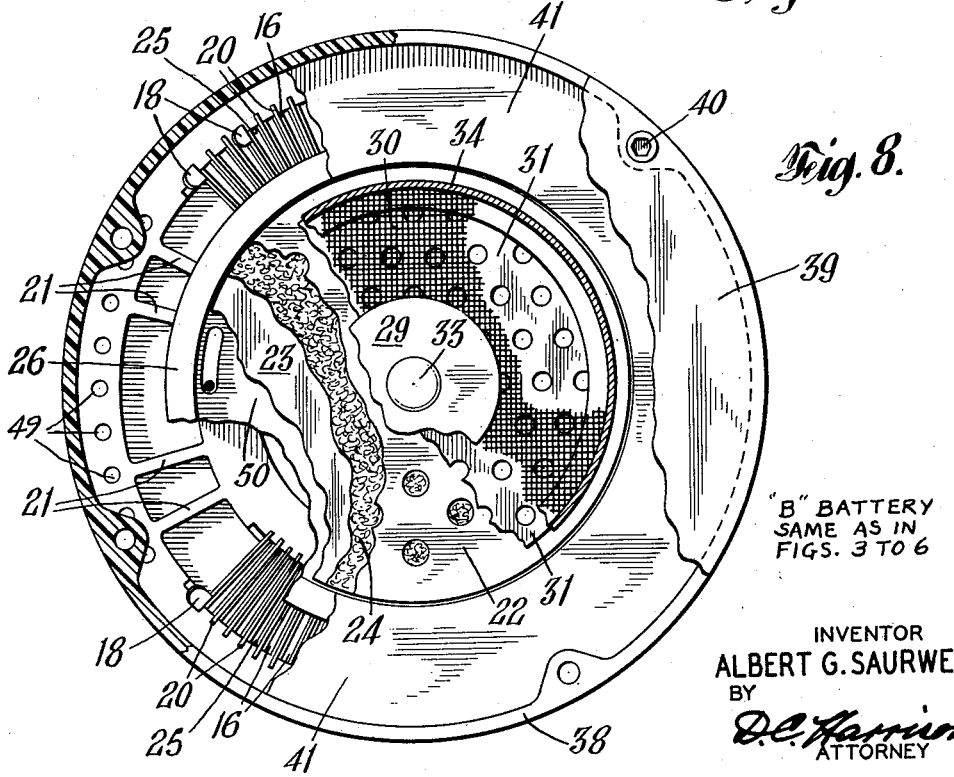
Fig. 8.
"B" BATTERY
SAME AS IN
FIGS. 3 TO 6
INVENTOR
ALBERT G. SAURWEIN
BY
ATTORNEY United States Patent Office
3,022,365
Patented Feb. 20, 1962

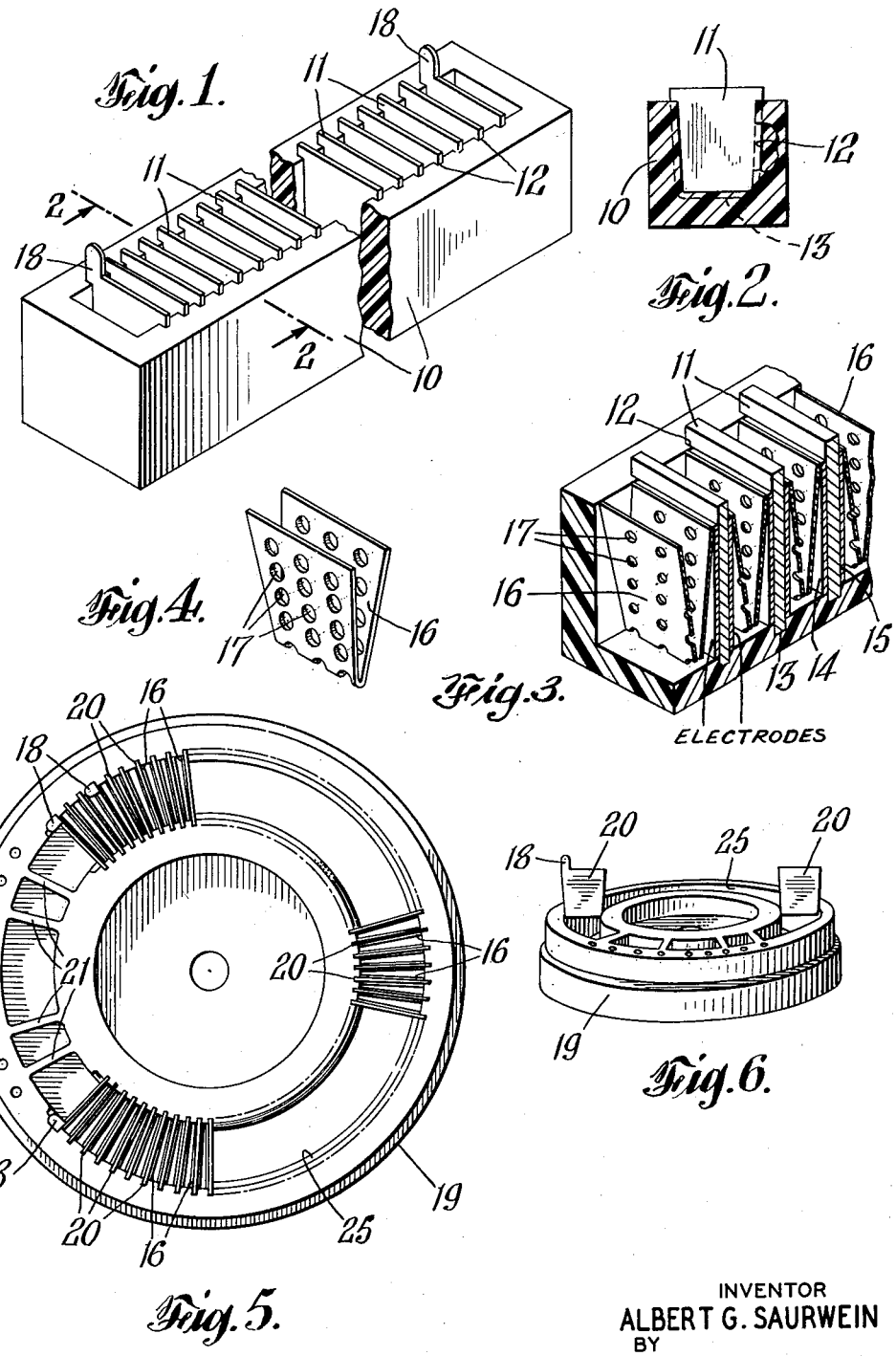

3,022,365
DEFERRED ACTION ELECTRIC BATTERY
Albert G. Saurwein, Cleveland, Ohio, assignor, by mesne assignments, to Union Carbide Corporation, a corporation of New York
Filed Dec. 26, 1946, Ser. No. 718,519
11 Claims. (Cl. 136—90)

This invention relates to an electric battery and has for an object to provide an improved method of making and assembling the same. Another object is to provide a deferred action battery capable of being activated by shock such as that of set-back in a projectile. A further object is to provide a battery in which liquid electrolyte is retained in contact with the electrodes even though the battery be subjected to mechanical shock or to gravity tending to flow the electrolyte out of the cell.

In providing a deferred action battery adapted for embodiment in a non-rotating projectile, considerable difficulty was experienced in getting one in which the electrolyte was retained in contact with the electrodes during the combination of forces to which such a battery was subjected. One suggestion was the provision of a deferred action battery in which the electrolyte was put into the battery in response to set-back breaking an ampule of electrolyte. But the trouble was to get the voltage to be maintained as long as desired because on subsequent shock the electrolyte tended to splash or flow out of the cell. A number of expedients were tried. One such was the provision of an absorbent material such as felt in the cell container. This was not found satisfactory due to time delay in bringing the voltage up to normal value after the electrolyte was supplied.

One expedient finally found satisfactory was the provision of capillary openings formed by non-bibulous material arranged between the battery plates so that the electrolyte would be retained in such openings by its surface tension and not tend to flow or splash out.

In the manufacture of a B or similar type battery having a channel shaped container of insulating material it has been discovered that a liquid tight compartment between each pair of electrodes could be made by heating metal, such as nickel, plates to a temperature above that at which the thermoplastic insulating material was deformable, and then pressing and guiding a series of such plates into position spanning the channel. In so doing the side edges of the plates were able to cut grooves in the sides of the container in which the plates became embedded. Pressure on the plates was continued until the bottom edge of each plate was similarly embedded in the thermoplastic material of the container.

The desired anode and cathode coatings, such as lead oxide and lead, could then be applied to the plates after they had been embedded in position, thus eliminating the danger of those coatings being adversely affected by heat or mechanical injury by the thermoplastic material tending to scrape or injure such coating were it to be embedded in that material.

FIG. 1 shows an embodiment of this invention in a B battery;
FIG. 2 is a section on the line 2—2 of FIG. 1;
FIG. 3 is a perspective through a portion of the battery with one wall broken away;
FIG. 4 is the detail of the electrolyte retainer;
FIG. 5 shows the invention applied to a battery in which the plates are arranged in an arcuate electrolyte receiving groove;
FIG. 6 is a perspective of the device of FIG. 5 showing a pair of plates withdrawn from the battery;
FIG. 7 shows a preferred embodiment of this invention as a deferred action battery;
FIG. 8 is a section on the line 8—8 with some portions broken away below the line.

The liquid or battery container 10 is of thermoplastic resinous material or other appropriate material inert to the electrolyte and of an electrical insulating character. Within the container are a plurality of nickel plates 11 forming separate liquid tight compartments between each pair of plates. A simple method of obtaining a liquid tight compartment on opposite sides and the bottom of each plate is to have the plates set into tight fitting grooves 12. A preferred way of obtaining this result is to heat the plates to a high enough temperature so that as the plate is pushed into position the thermoplastic material of the container 10 is melted enough to be deformed by the plate edges and provide a tight fit. Instead of heating one plate at a time a convenient number of plates may be simultaneously heated when they are arranged in a jig for accurately spacing and guiding the plates or container on relative movement therebetween for pushing the plates into the container. The temperature to which the plates are heated need not be much above the temperature at which the thermoplastic material is deformed. As shown in FIG. 2 the opposite side walls of the container 10 are beveled or sloped inwardly so that less deformation of the thermoplastic is necessary than would be the case if the channel walls were vertical. Not only are the opposite side edges of the plates embedded but also the bottom edge 13 is shown in FIG. 2. Where the thermoplastic container is of vinyl-chloride vinyl-acetate copolymer, the plate edges may be heated to only about 145° C. in order to effectively form the grooves desired in the container 10. In event the fit of the plate in this groove is not as tight as is necessary to form a liquid tight joint the loose portions may be painted with cyclohexanone which is enough of a solvent for the vinyl-chloride vinyl-acetate copolymer to cause a better joint to be formed. After treatment with said solvent the container and plates are air dried.

When the plates have been placed in position as shown in FIG. 1 lead perchlorate solution is placed in between the plates and a current passed through the several cells illustrated causing a coating of lead 14 to be deposited on one face of a plate and a coating of lead oxide 15 to be formed on the opposite face. These coatings are well known in the art. Instead of forming the coatings 14 and 15 on the plates 11 before they are inserted in position however, this invention contemplates their being applied to the plates after they have been embedded in their edge retaining grooves. In this manner any damage to the coatings 14 or 15 is minimized whereas if the coatings were applied first they might be injured as a result of the heating and handling incidental to forcing the plate edges into the thermoplastic material. After formation of the coatings the plates and container are rinsed and dried. A test for short circuit between any two plates is made to insure readiness of the container to receive the electrolyte of perchloric acid. This short circuit test may be made while the plating solution is present or may be made afterward with only water in the container.

A feature of the present invention is the provision of non-bibulous material 16 between the plates for the purpose of retaining the electrolyte in place against coming out by gravity or shock. Various absorbent materials were tried for this purpose but found unsatisfactory in speed of activation for the service under investigation. A plurality of capillary openings 17 are made in the non-bibulous sheet 16 so that surface tension of the electrolyte in these capillary openings and in the narrow spacings between the folds of the separator i.e., between the walls each side of the bend in sheet 16 and between the separator and the cell walls or electrodes is effective to prevent all of the electrolyte being lost in event the battery is inverted or subject to considerable shock or jar. This means that the electrodes of each cell must be close together and the angle between the sides of sheet 16 small. These holes also provide a low-resistance conducting path through the cell. Terminal tabs 18 are provided on the end plates for the attachment of the usual lead wires.

The arcuate container 19 shown in FIGS. 5 and 6 functions in the same manner as does the container in FIGS. 1–3, the container being of thermoplastic material and the plates 20 are beveled, have their edges heated to above a temperature for deforming the thermoplastic material, are pressed into place, then coated with appropriate anode and cathode material as described above, and finally have the electrolyte retainer 16 of non-bibulous material placed between each pair of plates. A portion of the circular groove or channel as shown in FIGS. 5 and 6 may be used for a "C" battery. Webs or partitions 21 separate portions of the arcuate groove or channel in use in the B battery and serve to insulate between the terminal ends of the battery.

Referring to FIGS. 7 and 8, the container 19 for a B and C battery is combined with an A battery and a deferred action container for electrolyte. The top plate 22 of the A battery is perforated as illustrated whereas the bottom plate 23 of the A battery is imperforate, these plates being separated by a thin layer of glass wool 24. The arcuate channel 25 in the container 19 holds the plates and electrolyte for the B and C battery. A peripheral wall 26 around the outer edge of the A battery plates serves as a weir or dam for electrolyte from the A battery overflowing into the B and C battery channel. A glass ampule 27 containing electrolyte is retained in a spring clip 28 above the A battery. Upon the container illustrated being subjected to substantial shock, such as that of set-back on a projectile on being fired, the ampule 27 is released from its clip 28 and strikes on the nickel plate 29 which serves as an anvil against which the ampule is broken. Surrounding the anvil is a wire mesh 30 which prevents particles of glass from getting into the A battery or into the surrounding B or C battery. Beneath the wire mesh is a perforate plate 31 for reinforcing the wire mesh and constituting a bottom for the ampule container 34. Between the plate 31 and the top plate 22 of the A battery is an insulating washer 32. A bolt 33 of brass or other appropriate material claps the B and C battery container 19 to the insulating body 50 containing the A battery plates and forming a weir 26, as well as the ampule container 34 with anvil 29 and perforate metal bottom 31. The ampule container 34 functions also as a guide to direct the liquid electrolyte from the ampule when broken on the A battery so that the A battery becomes filled with electrolyte and overflows before the B or C battery is activated. A cover 35 of cold rolled steel supports the ampule and clip on the ampule container 34. A layer of insulating material 36 such as a phenolic condensation product or paper impregnated therewith is laid over the top of the cover 35 and aligned wells provide an opening for a rivet 37 or other securing means for holding the spring clip 28 to the cover 35.

Surrounding the ampule container 34 is a casing 38 preferably of some thermosetting type of resinous insulating material arranged as illustrated and mounted on the peripheral shoulder in the extension 41 of insulating material. A top 39 also of suitable insulating material is clamped by the screws 40 to the casing 38. The extension 41 supports the casing 38 and the terminal leads from the A, B and C batteries passed through holes 49 in the extension 41 as illustrated to provide a suitable mounting for the foregoing combination. A bottom plate 43 also of insulating material is centered within a recess in the container 19 as shown in FIG. 7. The connection 47 leads from the top plate of the A battery while the connection 48 leads from the lower A battery plate. Socket terminals may be located in plates 39 and 43 to which the A, B and C battery terminals may be connected to facilitate the electrical connection of the battery unit to other elements of the complete apparatus.

Activation of the A battery before the B and C batteries are activated provides a desired time interval during which the electron devices of an apparatus supplied from the batteries may have their filaments heating in advance of B and C battery voltages being applied thereto. The B and C battery plates in FIGS. 5 to 8 inclusive are of the construction described in connection with FIG. 1 and likewise the plates are inserted in the container channel in the same manner, the channel being tapered as shown in FIGS. 5 to 8. Bibulous material was tried in the places between B and C battery plates and was found unsuitable because having an objectionable time lag in activation of the B and C cells. The non-bibulous material 16 was found superior in allowing the B and C cells to become activated quicker yet functions satisfactorily to retain electrolyte against spilling out under gravity or shock.

Among the advantages of this invention may be mentioned provision of a liquid tight compartment between B battery plates by the deformation of the thermoplastic material of which the container is composed and the edgewise insertion of the battery plates into position. The painting of the joints between the thermoplastic and plates with the aid of a fine brush and a solvent for the thermoplastic material aids in forming a better liquid tight joint. Coating the plates after they have been placed in position eliminates the possibility of injuring the anode and cathode coating as the plate edges are heated and pressed into the thermoplastic material. Having sides of the battery container sloping in each embodiment illustrated, enables the heated plates to be pressed edgewise into position without injury to the coatings. Activation of the A battery in advance of the B and C batteries provides a desirable short time interval during which the filament of an electron discharge device may become heated before the B or C batteries are applied to it. The folds and small holes in the non-bibulous material retain the electrolyte in contact with the B battery plates against spilling and provide a direct path for current between the plates. After the plates have been plated or coated with individual solutions they should be tested for short circuit before being used. The ampule guide 34 assists the A battery in being activated before electrolyte might flow into the B and C battery container without first being directed on the A battery.

I claim:

1. The method of activating a combination of A and B deferred action batteries which comprises supplying electrolyte to the A battery to fill and activate the same before said B battery and then activating said B battery by overflowing excess electrolyte from the A battery into said B battery.

2. An A battery, a B battery arranged to receive electrolyte by overflow from said A battery after it has been filled therewith, and an electrolyte container located above the A battery adapted to release electrolyte therefrom in response to shock on the container.

3. A battery comprising a container of thermoplastic material having side walls sloping downwardly toward one another, metal plates spanning the container at substantially a right angle to the opposite side walls with the plate edges similarly tapered and in recesses in the side walls and bottom of said container forming liquid tight compartments between said plates.

4. The combination of an A and B battery, each of the deferred action type, said A battery comprising generally horizontal plates, means above said A battery for supplying a predetermined amount of electrolyte thereto on activation, a weir surrounding said A battery above the active faces of said plates, said B battery being arcuate in shape, comprising more active plates than the A battery and arranged below and around said A battery whereby electrolyte may overflow from the A battery over said weir and into the B battery when said supplying means feeds electrolyte into the A battery.

5. A battery having spaced electrodes, a container for electrolyte, the electrolyte being between said electrodes, and non-bibulous material also between said electrodes and having formed within it and with the electrodes narrow openings of a size to retain a substantial amount of electrolyte therein by surface tension in event of the battery being tilted or subjected to shock.

6. A battery according to claim 5 in which the non-bibulous material includes folded sheets of plastic.

7. A battery according to claim 6 in which the folds constitute some of said openings, and perforations constitute additional openings in the sheets.

8. An electric battery of cells including a container for electrolyte, an anode and cathode plate for each cell of said battery, and means for retaining a substantial portion of electrolyte within the battery cells by means of surface tension of the electrolyte, said means comprising a folded plate of insulating plastic of V-shaped cross-section with the vertex of the V adjacent the bottom of the cell and the upper side end portions of the V contiguous the electrode plates, said insulating plate being of substantially the inside width of the container and provided with perforations therein whereby an upward thrust on the cell tends to transmit pressure on the electrolyte through the plate holes to the electrolyte contiguous the electrode plates, the angles between said electrode plates and the sides of said V being small enough to retain electrolyte therein by surface tension of the liquid.

9. In an electric cell having electrode plates, a container for said plates, and liquid electrolyte between said plates in the container, the combination therewith of the improvement for retaining the liquid electrolyte within said container when subjected to shock, said improvement including non-bibulous plates closely spaced and spaced closely to the electrode plates for retaining liquid electrolyte between said plates by surface tension when said electrolyte may tend to spill out under the influence of gravity or shock.

10. A cell according to claim 9 in which said non-bibulous plates are provided with perforations therein to assist in the retention of electrolyte within said perforations by surface tension.

11. A cell according to claim 10 in which said non-bibulous plates are provided with at least one fold with resiliency in the non-bibulous material at the fold to retain said such plates in position by friction and clamping pressure of the non-bibulous plates against the electrode plates.

References Cited in the file of this patent

UNITED STATES PATENTS

| | | |
|---|---|---|
| 985,045 | Madden | Feb. 21, 1911 |
| 1,116,818 | Holmes | Nov. 10, 1914 |
| 1,207,293 | Hodge | Dec. 5, 1916 |
| 1,381,298 | Gill | June 14, 1921 |
| 1,497,531 | Ahlgren | June 10, 1924 |
| 1,631,511 | Benner | June 7, 1927 |
| 1,784,216 | Aldrich et al. | Dec. 9, 1930 |
| 1,916,709 | Zimmerman | July 4, 1933 |
| 2,187,638 | Zernike | Jan. 16, 1940 |
| 2,441,896 | Moir | May 18, 1948 |

FOREIGN PATENTS

| | | |
|---|---|---|
| 20,398 | Great Britain | of 1906 |
| 163,992 | Great Britain | July 27, 1922 |
| 526,800 | Great Britain | Sept. 25, 1940 |

OTHER REFERENCES

Kleiderer: Modern Plastics, November 1945, pp. 136 and 206.